US012253390B2

(12) United States Patent
Dupuis

(10) Patent No.: US 12,253,390 B2
(45) Date of Patent: Mar. 18, 2025

(54) DEVICE FOR ESTIMATING THE SENSITIVITY OF A SENSOR, ASSOCIATED METHOD AND SYSTEM

(71) Applicant: SKF Magnetic Mechatronics, Saint-Marcel (FR)

(72) Inventor: Yves Dupuis, Saint-Just (FR)

(73) Assignee: SKF Magnetic Mechatronics, Saint-Marcel (FR)

( * ) Notice: Subject to any disclaimer, the term of this patent is extended or adjusted under 35 U.S.C. 154(b) by 78 days.

(21) Appl. No.: 17/981,318

(22) Filed: Nov. 4, 2022

(65) Prior Publication Data
US 2023/0168112 A1 Jun. 1, 2023

(30) Foreign Application Priority Data

Nov. 26, 2021 (FR) ........................ 2112586

(51) Int. Cl.
*G01D 5/20* (2006.01)
*F16C 32/04* (2006.01)
(52) U.S. Cl.
CPC ........... *G01D 5/20* (2013.01); *F16C 32/0474* (2013.01)
(58) Field of Classification Search
CPC ....... G01D 5/20; F16C 32/0474; G01R 33/00; G01R 33/0035; G01R 33/0023; G01R 33/0017; G01R 31/3191; G01B 7/004; G01C 17/38; G06F 3/017; G06F 3/0346; G06F 3/012
See application file for complete search history.

(56) References Cited

U.S. PATENT DOCUMENTS

2014/0352136 A1* 12/2014 Decitre .............. G01N 27/9006
29/602.1
2016/0290351 A1* 10/2016 Kawashima .......... F04D 19/042

FOREIGN PATENT DOCUMENTS

| CA | 2858922 C | | 9/2019 | |
|---|---|---|---|---|
| JP | 2002081444 A | * | 3/2002 | .......... F16C 32/0444 |
| WO | WO-2006030824 A1 | * | 3/2006 | .......... F16C 32/0446 |

* cited by examiner

*Primary Examiner* — Jermele M Hollington
*Assistant Examiner* — Taqi R Nasir
(74) *Attorney, Agent, or Firm* — GARCIA-ZAMOR INTELLECTUAL PROPERTY LAW, LLC; Ruy Garcia-Zamor

(57) ABSTRACT

A device for estimating the sensitivity of a position sensor for a magnetic bearing supporting a rotor, the sensor being capable of measuring the position of the rotor in relation to the magnetic bearing, the magnetic bearing including at least one shaft provided with at least two radially opposite coils. The device includes a control, a current-measuring component, a component for measuring the initial position of the rotor, a component for determining a variation in currents, a component for determining a movement of the rotor, and a component for determining the sensitivity of the sensor, configured to determine the sensitivity of the position sensor based on a movement setpoint and on the value of a movement of the rotor.

10 Claims, 2 Drawing Sheets

DEVICE FOR ESTIMATING THE SENSITIVITY OF A SENSOR, ASSOCIATED METHOD AND SYSTEM

CROSS-REFERENCE TO RELATED APPLICATIONS

This application claims priority to French Patent Application no. 2112586, filed Nov. 26, 2021, the contents of which is fully incorporated herein by reference.

TECHNICAL FIELD

The present invention concerns magnetic-levitation magnetic bearings and relates to position sensors for sensing the position of a rotor in a stator of a magnetic bearing. It more particularly relates to a device for estimating the sensitivity of a position sensor of a rotor, to a system including a magnetic bearing and such a device, and to the implementation of such a device.

PRIOR-ART TECHNIQUES

Generally, during commissioning of a machine comprising a magnetic bearing including a stator and a rotor that is held in levitation in the stator, the sensitivity of position sensors measuring the radial and/or axial position of the rotor in the stator is determined with a view to adjusting the machine.

The sensitivity of a sensor is defined as being the value of the electrical measurement of the sensor in relation to the mechanical movement of the rotor measured using an accurate comparator. However, in certain cases, it is not easy or even impossible to measure the radial and/or axial mechanical movement of the rotor using the accurate comparator.

In light of the above, the invention proposes to overcome the above-mentioned drawback.

SUMMARY OF THE INVENTION

One subject of the invention is therefore a method for estimating the sensitivity of a position sensor for a magnetic bearing supporting a rotor, the sensor being capable of measuring the position of the rotor in relation to the magnetic bearing, the magnetic bearing including at least one shaft provided with at least two radially opposite coils, the method comprising:
  the levitation of the rotor in the magnetic bearing such that the rotor is centred in the magnetic bearing,
  once the rotor is centred in the magnetic bearing, a first measurement of the control currents of the coils of the shaft of the magnetic bearing and a measurement of the initial position of the rotor,
  the application of a predetermined movement setpoint such that the rotor moves in the bearing in a predetermined direction to reach an intermediate position,
  a second measurement of the control currents of the coils of the shaft of the magnetic bearing once the rotor has reached the intermediate position,
  the determination of the variation in the control currents caused by the movement setpoint,
  the determination of the value of the movement of the rotor to reach the intermediate position based on the measurement of the initial position of the rotor, on the first measurement of the control currents, on the second measurement of the control currents and on the variation in the control currents, and
  the determination of the sensitivity of the sensor based on the movement setpoint and on the value of the movement of the rotor.

The determination of the sensitivity of the sensor does not require the implementation of an additional device for measuring the position of the rotor in the stator.

The sensitivity of the position sensor is determined based on elements of a machine implementing the magnetic bearing.

Preferably, the determination of the sensitivity of the sensor comprises the division of the movement setpoint by the value of the movement of the rotor.

In one mode of implementation, the movement setpoint comprises a radial movement setpoint of the rotor in the stator. In this case, the method determines the sensitivity of a radial position sensor.

In one mode of implementation, the movement setpoint comprises an axial movement setpoint of the rotor in the magnetic bearing. In this case, the method determines the sensitivity of an axial position sensor.

Advantageously, the movement setpoint comprises a voltage setpoint.

Preferably, the value of the movement of the rotor is determined based on an equation linking the value of the movement to the measurement of the initial position of the rotor, to the first measurement of the control currents, to the second measurement of the control currents and to the variation in the control currents.

Advantageously, the shaft of the bearing including two half-shafts each including one of the coils, the determination of the value of the movement of the rotor comprises:
  the determination for each half-shaft of a matrix of the magnetic forces linking the position of the rotor in the magnetic bearing and a control current of the half-shaft to the magnetic force generated by the half-shaft,
  the determination of a function that is representative of the equilibrium of the rotor in the magnetic bearing, linking the movement of the rotor in the stator to the matrices of the magnetic forces of the half-shafts, to the initial position of the rotor, to the first measurement of the control currents, to the second measurement of the control currents and to the variation in the control currents, and
  the implementation of an optimization algorithm for determining the value of the movement of the rotor by minimizing the function.

Preferably, the optimization algorithm comprises a Nelder-Mead simplex algorithm.

Another subject of the invention is a device for estimating the sensitivity of a position sensor for a magnetic bearing supporting a rotor, the sensor being capable of measuring the position of the rotor in relation to the magnetic bearing, the magnetic bearing including at least one shaft provided with at least two radially opposite coils, comprising:
  control means configured to levitate the rotor in the magnetic bearing such that the rotor is centred in the magnetic bearing,
  current-measuring means configured to measure a first set of control currents of the coils of the shaft of the magnetic bearing once the rotor is centred in the magnetic bearing,
  means for measuring the initial position of the rotor once the rotor is centred in the magnetic bearing,
  the control means being further configured to apply a predetermined movement setpoint such that the rotor moves in the magnetic bearing in a predetermined direction to reach an intermediate position, the current-measuring means being further configured to measure a second set of control currents of the coils of the shaft of the magnetic bearing once the rotor has reached the intermediate position, means for determining a variation in currents, configured to determine the variation, in the control currents, caused by the movement setpoint, means for determining a movement of the rotor, configured to determine the value of the movement of the rotor to reach the intermediate position based on the measurement of the initial position of the rotor, on the first set of control currents, on the second set of control currents and on the variation in the control currents, and means for determining the sensitivity of the sensor, configured to determine the sensitivity of the position sensor based on the movement setpoint and on the value of the movement of the rotor.

Another subject of the invention is a magnetic-levitation system including a magnetic-levitation rotary machine comprising a magnetic-levitation magnetic bearing supporting a rotor of the machine and a position sensor for sensing the position of the rotor in relation to the magnetic bearing, and an estimation device such as defined above.

BRIEF DESCRIPTION OF THE DRAWINGS

At least one of the embodiments of the present invention is accurately represented by this application's drawings which are relied on to illustrate such embodiment(s) to scale and the drawings are relied on to illustrate the relative size, proportions, and positioning of the individual components of the present invention accurately relative to each other and relative to the overall embodiment(s). Those of ordinary skill in the art will appreciate from this disclosure that the present invention is not limited to the scaled drawings and that the illustrated proportions, scale, and relative positioning can be varied without departing from the scope of the present invention as set forth in the broadest descriptions set forth in any portion of the originally filed specification and/or drawings. Further aims, features and advantages of the invention will become apparent on reading the following description, which is given purely by way of non-limiting example and with reference to the appended drawings, in which.

DETAILED DESCRIPTION OF THE INVENTION

Figure 1:
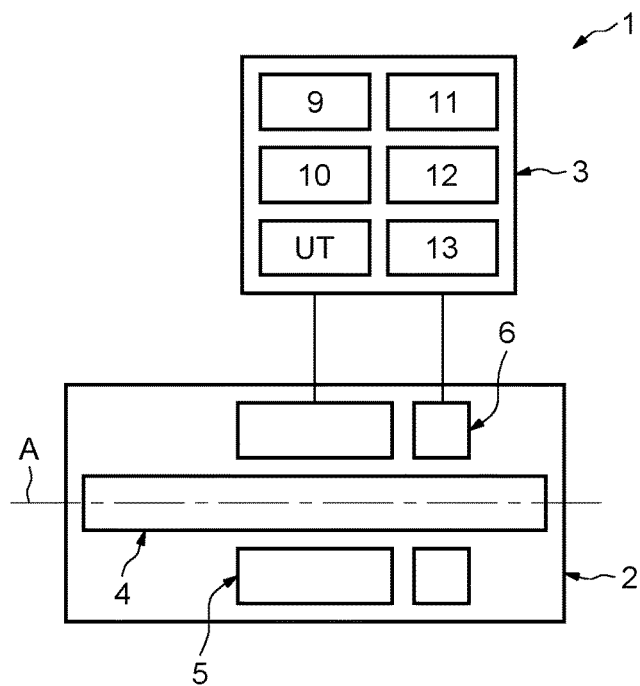
FIG. 1 illustrates one example of a magnetic suspension system according to the invention.

Those of ordinary skill in the art will appreciate from this disclosure that when a range is provided such as (for example) an angle/distance/number/weight/volume/spacing being between one (1 of the appropriate unit) and ten (10 of the appropriate units) that specific support is provided by the specification to identify any number within the range as being disclosed for use with a preferred embodiment. For example, the recitation of a percentage of copper between one percent (1%) and twenty percent (20%) provides specific support for a preferred embodiment having two point three percent (2.3%) copper even if not separately listed herein and thus provides support for claiming a preferred embodiment having two point three percent (2.3%) copper. By way of an additional example, a recitation in the claims and/or in portions of an element moving along an arcuate path by at least twenty (20°) degrees, provides specific literal support for any angle greater than twenty (20°) degrees, such as twenty-three (23°) degrees, thirty (30°) degrees, thirty-three-point five (33.5°) degrees, forty-five (45°) degrees, fifty-two (52°) degrees, or the like and thus provides support for claiming a preferred embodiment with the element moving along the arcuate path thirty-three-point five (33.5°) degrees. FIG. 1 shows one example of a magnetic suspension system 1 including a magnetic-levitation rotary machine 2 and a device 3 for estimating the sensitivity of a position sensor.

The machine 2 comprises a rotor 4 with a central axis A, and a magnetic-levitation magnetic bearing 5 supporting the rotor 4.

The machine 2 further comprises a position sensor 6 for sensing the position of the rotor 4 in the magnetic bearing 5.

The sensor 6 measures the axial position of the rotor 4 in relation to the magnetic bearing 5.

As a variant, the sensor 6 may measure the radial position of the rotor 4 in relation to the magnetic bearing 5.

Figure 2:
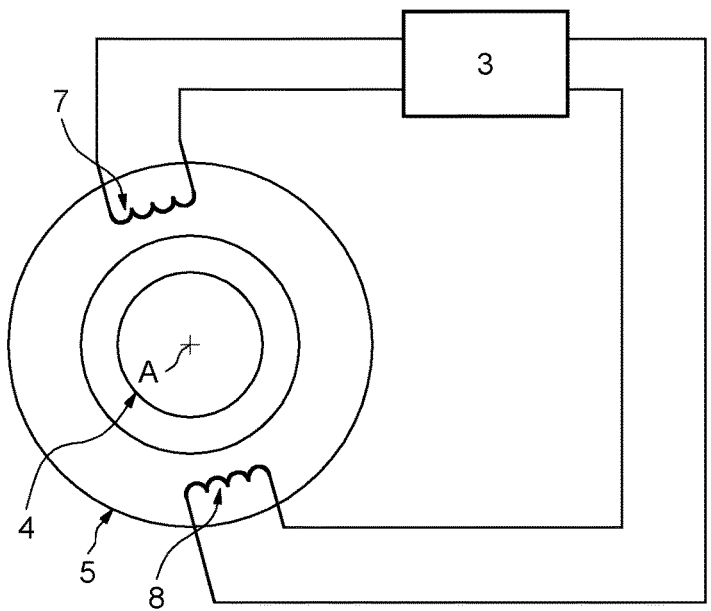
FIG. 2 illustrates one example of a magnetic bearing according to the invention.

As shown in FIG. 2, the magnetic bearing 5 comprises a shaft including two radially opposite coils 7, 8.

As a variant, the shaft includes two groups of radially opposite coils.

The magnetic bearing 5 and the position sensor 6 are linked to the estimation device 3.

Referring again to FIG. 1, the estimation device 3 estimates the sensitivity of the sensor 6 and comprises control means 9 that energize the coils 7, 8 to levitate the rotor 4 in the magnetic bearing 5 such that the rotor 4 is centred in the magnetic bearing 5.

The control means further apply a predetermined movement setpoint Xelec such that the rotor 4 moves in the magnetic bearing 5 in a predetermined direction to reach an intermediate position.

The movement setpoint Xelec is for example a voltage setpoint.

The predetermined direction is chosen depending on the type of sensor 6, that is to say whether the sensor 6 measures a radial position or an axial position.

To determine the radial measurement sensitivity of the sensor 6, the predetermined direction is oriented in a direction perpendicular to the central axis A.

To determine the axial measurement sensitivity of the sensor 6, the predetermined direction is oriented along the central axis A.

The estimation device 3 further comprises current-measuring means 10 that measure a first set SET1 of control currents IO1, IO2 of the coils 7, 8, delivered by the control means 9 once the rotor 4 is centred in the magnetic bearing 5.

The current-measuring means 10 further measure a second set SET2 of control currents I1, I2 of the coils 7, 8 once the rotor 4 has reached the intermediate position.

The intermediate position is reached once the sensor 6 detects no variation in the position of the rotor 4 after the coils 7, 8 have been energized according to the movement setpoint transmitted by the control means 10.

The estimation device 3 comprises means for measuring the initial position E0 of the rotor 4 once the rotor is centred in the magnetic bearing 5.

The means for measuring the initial position E0 of the rotor 4 are formed by the sensor 6.

As a variant, the measuring means could comprise a second position sensor measuring the initial position of the rotor 4.

The estimation device 3 comprises means 11 for determining a variation in currents, which determine the variation, in the control currents $\Delta I1$, $\Delta I2$, caused by the movement setpoint.

The estimation device 3 further comprises means 12 for determining a movement of the rotor 4 in the magnetic bearing 5.

The means 12 for determining a movement determine the value of the movement Z1 of the rotor 4 to reach the intermediate position based on the measurement of the initial position E0 of the rotor 4, on the first set SET1 of control currents, on the second set SET2 of control currents and on the variation $\Delta I1$, $\Delta I2$ in the control currents.

The estimation device 3 comprises means 13 for determining the sensitivity of the sensor 6, which determine the sensitivity S6 of the position sensor 6 based on the movement setpoint Xelec and on the value, of the movement Z1 of the rotor 4, determined by the means 12 for determining a movement.

The control means 9, the measuring means 10, the means 11 for determining a variation in currents, the means 12 for determining a movement, and the means 13 for determining the sensitivity are implemented by a processing unit UT of the estimation device 3.

Figure 3:
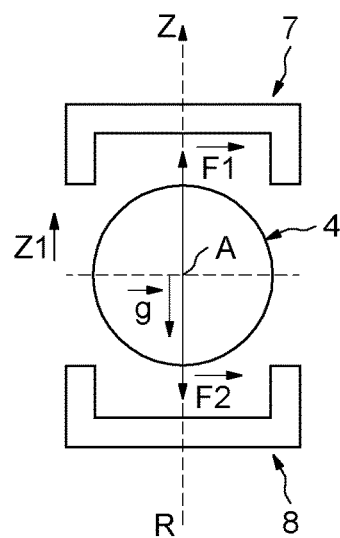
FIG. 3 illustrates one example of modelling of the rotor in the magnetic bearing according to the invention.

FIG. 3 illustrates one example of modelling of the rotor 4 in the magnetic bearing 5.

It can be assumed that the rotor 4 is disposed horizontally in relation to the ground and that the sensor 6 measures the radial position of the rotor 4 in relation to the magnetic bearing 5.

According to another embodiment, the rotor 4 is disposed vertically in relation to the ground.

The rotor 4 is subjected to gravity, represented by the gravity vector $\vec{g}$.

R is a reference frame comprising an axis Z oriented opposite the gravity vector $\vec{g}$.

Of course, the rotor 4 may be subjected to other external forces modelled by vectors.

The rotor 4 is subjected to the magnetic forces generated by the coils 7, 8 represented by the vectors $\vec{F1}$, $\vec{F2}$.

According to the fundamental principles of dynamics, once the rotor 4 is centred between the coils 7, 8, the equilibrium equation of the forces is written:

$$\vec{F1}(E0,IO1)+\vec{F2}(E0,IO2)+\vec{g}=\vec{0} \quad (1)$$

Once the control means apply the radial movement setpoint Xelec, the rotor 4 moves in the magnetic bearing 5 along the axis Z to reach the intermediate position.

Let Z1 be the value of the movement of the rotor 4 to reach the intermediate position.

Once the rotor 4 reaches the intermediate position, the equilibrium equation of the forces is written:

$$\vec{F1}(E0-Z1,IO1+\Delta I1)+\vec{F2}(E0+Z1,IO2+\Delta I2)+\vec{g}=\vec{0} \quad (2)$$

Combining equations (1) and (2) gives:

$$\vec{F1}(E0-Z1,IO1+\Delta I1)+\vec{F2}(E0+Z1,IO2+\Delta I2)- \\ \vec{F1}(E0,IO1)-\vec{F2}(E0,IO2)=\vec{0} \quad (3)$$

The sensitivity S6 of the sensor 6 is such that:

$$S6 = \frac{Xelec}{Z1} \quad (4)$$

Since the radial movement setpoint Xelec is known, the value of the movement Z1 is determined based on equation (3) to determine the sensitivity S6 of the sensor 6.

The determination of the sensitivity of the sensor 6 based on equations (3) and (4) does not require any balancing of the control currents of the coils 7, 8 (i.e. bias currents) by a movement of the rotor 4 to take into account external forces (i.e. gravity), making it possible to keep the rotor 4 centred such that the sensor 6 operates in its linearity range for the estimation of the sensitivity S6 of the sensor 6.

Figure 4:
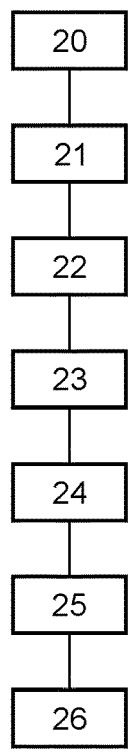
FIG. 4 illustrates a first example of implementation of an estimation device according to the invention.

FIG. 4 illustrates one example of implementation of the estimation device 3.

During a step 20, the control means 9 energize the coils 7, 8 such that the levitating rotor 4 is centred in the magnetic bearing 5.

During a step 21, the current-measuring means 10 measure the first set SET1 of control currents IO1, IO2 of the coils 7, 8.

During a step 22, the control means 9 apply the movement setpoint voltage Xelec such that the rotor moves in the bearing 5 in a radial direction parallel to the axis Z to reach the intermediate position.

During a step 23, the current-measuring means 10 measure the second set SET2 of control currents I1, I2 of the coils 7, 8 once the rotor 4 has reached the intermediate position.

Then during a step 24, the means 11 for determining a variation in currents determine the variation $\Delta I1$, $\Delta I2$, in the control currents, caused by the movement setpoint Xelec:

$$\Delta I1 = I1 - I01 \quad (5)$$

$$\Delta I2 = I2 - I02 \quad (6)$$

During a step 25, the means 12 for determining a movement determine the value of the movement Z1 of the rotor 4 to reach the intermediate position.

During a step 26, the means 13 for determining the sensitivity of the sensor 6 determine the sensitivity S6 of the sensor 6 based on equation (4).

A first mode of implementation of the means 12 for determining a movement is now detailed.

The value of the movement Z1 of the rotor 4 is determined based on an equation EQ linking the movement value Z1 to the measurement of the initial position E0 of the rotor 4, to the first measurement SET1 of the control currents, to the second measurement SET2 of the control currents and to the variation $\Delta I1$, $\Delta I2$ in the control currents.

The equation EQ is such that:

$$EQ = P = E0^2\left[(I01+\Delta I1)^2 - (I02+\Delta I2)^2 + I02^2 - I01^2\right] + \\ 2E0\left[(I01+\Delta I1)^2 + (I02+\Delta I2)^2\right]z + \\ \left[(I01+\Delta I1)^2 - (I02+\Delta I2)^2 - 2(I02^2 - I01^2)\right]z^2 + \\ \frac{(I02^2 - I01^2)}{E0^2}z^4 = 0 \quad (13)$$

By calculating the roots of the polynomial P of order four and by keeping only the root that is situated in the interval of the magnetic gap between the bearing 5 and the rotor 4, the estimated value of the movement Z1 is obtained.

Once bias currents of the coils 7, 8 are identical, it can be assumed that I01=I02=I0 and that ΔI1=ΔI2=ΔI such that the polynomial P is truncated to order one.

The following is obtained:

$$Z1 = -E0\frac{\Delta I}{I0}\frac{1}{1+\left(\frac{\Delta I}{I0}\right)^2} \quad (14)$$

For small variations in the gap between the rotor 4 and the bearing 5, it can be assumed that the term ΔI is negligible in relation to the term I0 such that $$Z1=-E0\Delta I/I0 \quad (15)$$

A second mode of implementation of the means 12 for determining a movement is now detailed.

This second mode is based on the minimization of a cost function Fc derived from equation (3):

$$Fc(Z1) = \min_{Z1}\left[\vec{F11}(E0-Z1, I01+\Delta I1) + \vec{F22}(E0+Z1, I02+\Delta I2) - \vec{F11}(E0, I01) - \vec{F22}(E0, I02)\right] \quad (16)$$

In this mode of implementation, it is sought to determine the value of the movement Z1 by minimizing the function Fc.

Figure 5:
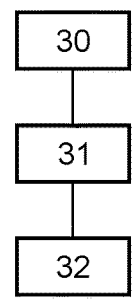
FIG. 5 illustrates a second example of implementation of an estimation device according to the invention.

FIG. 5 illustrates one example of implementation of the estimation device 3 according to the second mode of implementation of the means 12 for determining a movement.

During a step 30, for each half-shaft of the bearing 5, a matrix $\vec{F11}$, $\vec{F22}$ of magnetic forces $\vec{F1}$, $\vec{F2}$ links the position of the rotor 4 in the magnetic bearing 5 and the control current of the coil of the half-shaft to the magnetic force generated by the half-shaft.

The matrices $\vec{F11}$, $\vec{F22}$ of magnetic forces are determined for example by a method for modelling the bearing 5 and rotor 4, such as the finite element method.

As a variant, the matrices $\vec{F11}$, $\vec{F22}$ of magnetic forces take into account the magnetic coupling of the coils 7, 8 to one another.

During a step 31, equation (16) is formed.

Next, during a step 32, an optimization algorithm is implemented by the means 12 for determining a movement in order to determine the value of the movement Z1.

The means 12 for determining a movement for example implement a Nelder-Mead simplex algorithm.

The determination of the sensitivity of the sensor 6 does not require the implementation of an additional device for measuring the position of the rotor in the stator.

The sensitivity of the position sensor is determined based on elements of a machine implementing the magnetic bearing.

The invention claimed is:

1. A method for estimating the sensitivity of a position sensor for a magnetic bearing supporting a rotor while the magnetic bearing, the rotor and the position sensor are located within a machine, the sensor being capable of measuring the position of the rotor in relation to the magnetic bearing, comprising:
providing the magnetic bearing including at least one shaft having at least two radially opposite coils,
centering the rotor in the magnetic bearing by levitation of the rotor in the magnetic bearing,
obtaining a first measurement of the control currents of the coils of the shaft of the magnetic bearing and a measurement of the initial position of the rotor once the rotor is centered in the magnetic bearing,
applying a predetermined movement setpoint, which comprises a voltage setpoint, such that the rotor moves in the bearing in a predetermined direction to reach an intermediate position,
obtaining a second measurement of the control currents of the coils of the shaft of the magnetic bearing once the rotor has reached the intermediate position, which is reached when the rotor has reached a stable position after the application of the voltage setpoint,
determining the variation in the control currents, which comprises the second control currents minus the first control currents, caused by the movement setpoint,
determining the value of the movement of the rotor to reach the intermediate position based on the measurement of the initial position of the rotor, on the first measurement of the control currents, on the second measurement of the control currents and on the variation in the control currents, and
determining the sensitivity of the sensor based on the movement setpoint and on the value of the movement of the rotor, wherein the sensitivity of the sensor is calculated by dividing the voltage setpoint by the value of the movement such that it is not necessary to use an additional device to measure the position of the rotor in the stator.

2. The method according to claim 1, wherein it is not necessary to use a separate calibration device which needs to access the interior of the magnetic bearing to determine the sensitivity of the sensor.

3. The method according to claim 1, wherein the movement setpoint comprises a radial movement setpoint of the rotor in the stator.

4. The method according to claim 1, wherein the movement setpoint comprises an axial movement setpoint of the rotor in the magnetic bearing.

5. The method according to claim 1, wherein determining the value of the movement does not require the use of an accurate comparator.

6. The method according to claim 1, wherein the value of the movement of the rotor is determined based on an equation linking the value of the movement to the measurement of the initial position of the rotor, to the first measurement of the control currents, to the second measurement of the control currents and to the variation in the control currents.

7. The method according to claim 1, further comprising the shaft of the bearing including two half-shafts each including one of the coils, wherein the determination of the value of the movement of the rotor comprises:
determining for each half-shaft of a matrix of the magnetic forces linking the position of the rotor in the magnetic bearing and a control current of the half-shaft to the magnetic force generated by the half-shaft,
determining a function that is representative of the equilibrium of the rotor in the magnetic bearing, linking the movement of the rotor in the stator to the matrices of the magnetic forces of the half-shafts, to the initial position of the rotor, to the first measurement of the control currents, to the second measurement of the control currents and to the variation in the control currents, and implementing an optimization algorithm for determining the value of the movement of the rotor by minimizing the function.

8. The method according to claim 7, wherein the optimization algorithm comprises a Nelder-Mead simplex algorithm.

9. A device for estimating the sensitivity of a position sensor for a magnetic bearing supporting a rotor while the magnetic bearing, the rotor and the position sensor are located within a machine, the sensor being capable of measuring the position of the rotor in relation to the magnetic bearing, the magnetic bearing including at least one shaft provided with at least two radially opposite coils, comprising:
control means configured to levitate the rotor in the magnetic bearing such that the rotor is centred in the magnetic bearing,
current-measuring means configured to measure a first set of control currents of the coils of the shaft of the magnetic bearing once the rotor is centered in the magnetic bearing,
means for measuring the initial position of the rotor once the rotor is centered in the magnetic bearing,
the control means being further configured to apply a predetermined movement setpoint, which is a predetermined voltage, such that the rotor moves in the magnetic bearing in a predetermined direction to reach an intermediate position which is reached when the rotor has reached a stable position after the application of the predetermined voltage,
the current-measuring means being further configured to measure a second set of control currents of the coils of the shaft of the magnetic bearing once the rotor has reached the intermediate position,
means for determining a variation in currents, which is the second control currents minus the first control currents, configured to determine the variation, in the control currents, caused by the movement setpoint,
means for determining a movement of the rotor, configured to determine the value of the movement of the rotor to reach the intermediate position based on the measurement of the initial position of the rotor, on the first set of control currents, on the second set of control currents and on the variation in the control currents, and
means for determining the sensitivity of the sensor, configured to determine the sensitivity of the position sensor based on the movement setpoint and on the value of the movement of the rotor, wherein the sensitivity of the sensor is calculated by dividing the voltage setpoint by the value of the movement such that it is not necessary to use an additional device to measure the position of the rotor in the stator.

10. A magnetic-levitation system including a magnetic-levitation rotary machine comprising a magnetic-levitation magnetic bearing supporting a rotor of the machine and a position sensor for sensing the position of the rotor in relation to the magnetic bearing, and an estimation device according to claim 9.

* * * * *